A. RÖMER.
PROCESS FOR THE CONTINUOUS MANUFACTURE BY FERMENTATION OF BEVERAGES CONTAINING CARBONIC ACID.
APPLICATION FILED JAN. 8, 1912.

1,043,361.

Patented Nov. 5, 1912.

UNITED STATES PATENT OFFICE.

ADOLF RÖMER, OF STUTTGART, GERMANY.

PROCESS FOR THE CONTINUOUS MANUFACTURE BY FERMENTATION OF BEVERAGES CONTAINING CARBONIC ACID.

1,043,361. Specification of Letters Patent. Patented Nov. 5, 1912.

Application filed January 8, 1912. Serial No. 669,948.

*To all whom it may concern:*

Be it known that I, ADOLF RÖMER, a citizen of the German Empire, residing at Stuttgart, in the Kingdom of Wurttemberg, Empire of Germany, have invented certain new and useful Improvements in Processes for the Continuous Manufacture by Fermentation of Beverages Containing Carbonic Acid, of which the following is a specification.

The present invention relates to a process for the uninterrupted manufacture of beverages containing carbonic acid, especially sparkling wines, by fermentation with the aid of various vessels which are connected to one another by pipes for transferring the liquid between the various vessels and for filling and emptying and for evenly distributing the carbonic acid produced in the fermentation process.

Bottles filled with wine are emptied into the system and refilled with sparkling wine in such a manner that the amount of still wine entering is the same as that of sparkling wine withdrawn. In the system of fermenting vessels, the various vessels are kept in various stages of the fermenting operation, the fermentation being the more advanced the older the yeast in a particular vessel. Still wine emptied from the bottles enters the fermentation vessel which has last been charged with yeast and passes through the several fermenting vessels successively until it reaches the vessel which was first charged with yeast. From this it is drawn off as sparkling wine. The carbonic acid generated during the fermenting operations remains in the system of pipes and vessels and the sparkling wine is withdrawn charged therewith. Owing to the manner of operation, this wine is so permanently charged with the carbonic acid that it escapes but slowly when the wine is allowed to stand.

A suitable organization of apparatus for use in the present process is diagrammatically shown in the accompanying drawing in which—

Figure 1:
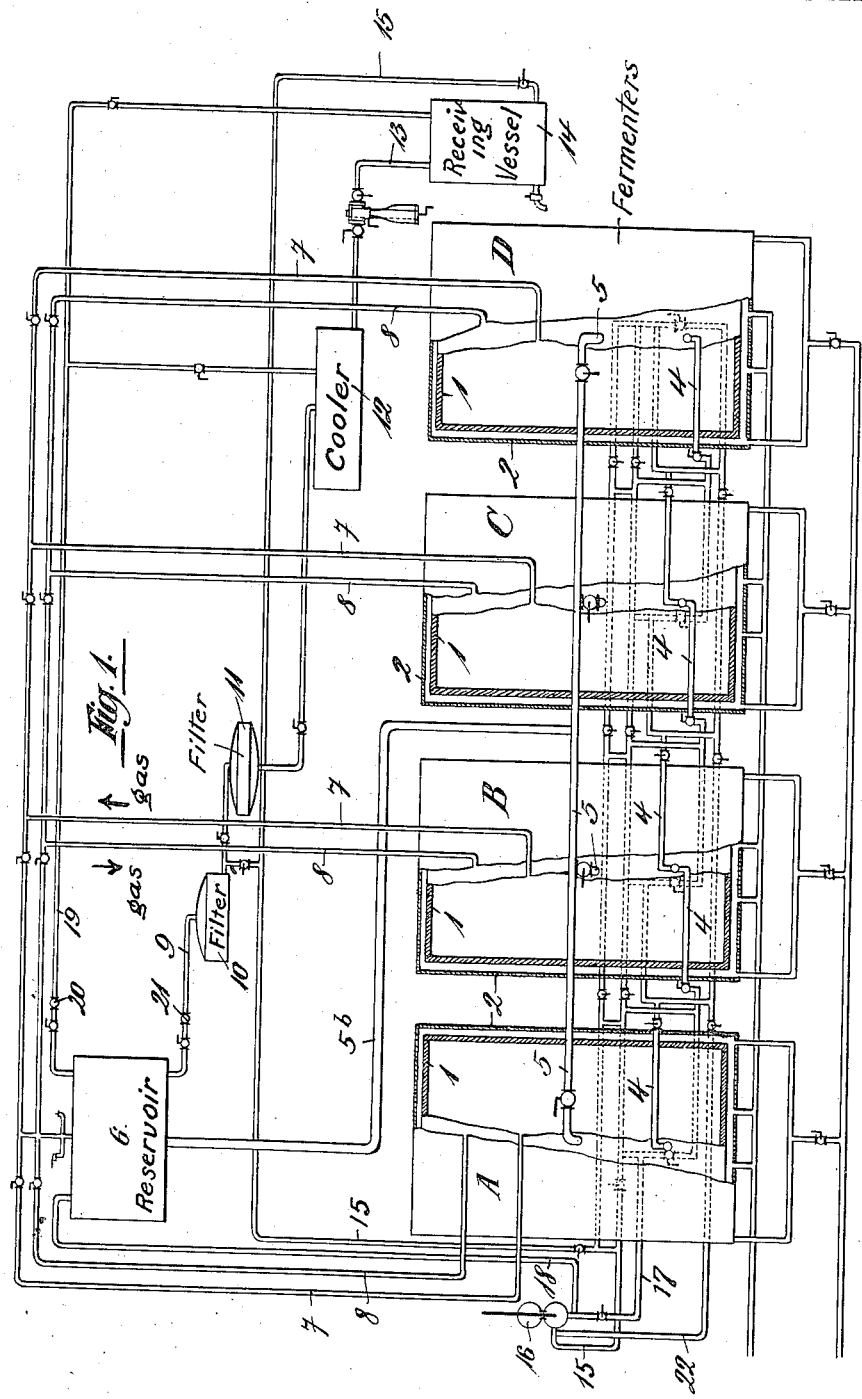
Figure 2:
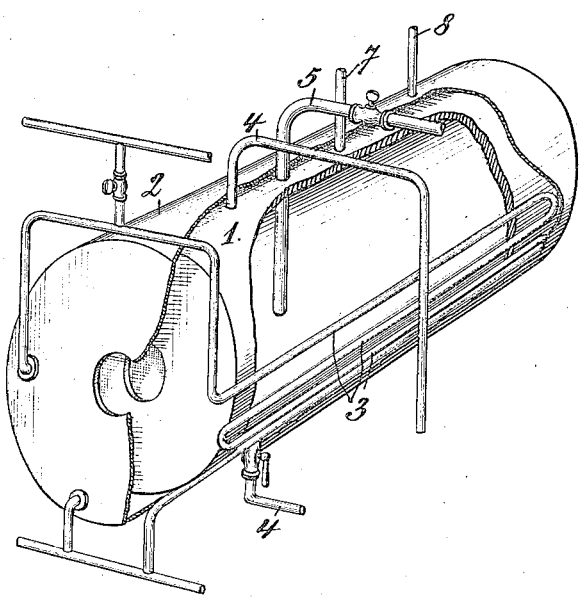

Figure 1 represents a complete organization partly in plan; and Fig. 2 represents, partly in section, a single fermenting vessel with connecting piping.

For the purpose of explaining the process four fermenting vessels are shown, respectively, A, B, C and D. Each of these four fermenting vessels consists of a strong wooden cylinder 1 which is surrounded by an iron casing 2. Water is contained in the space between the wooden vessel and the casing which may be kept warmed or cooled by means of a copper pipe 3 which may (as shown in Fig. 2) extend within the intermediate space. By this means the contents of the wooden vessels 1 may be kept at any desired temperature. The wooden cylinders, that is to say the fermentation vessels proper 1, are connected together by pipes 4, which latter are so arranged that the pipes are connected to the top of one vessel and to the base of the next fermentation vessel. Further an ascending pipe 5 is connected to each vessel and is connected through 5ᵇ to the reservoir 6, common to all the fermentation vessels 1. Pipes 7 connected to each fermentation vessel serve to lead the carbonic acid generated during the fermentation process to the reservoir 6. A second equalizing pipe 8 having a connection with this reservoir is connected to the iron sheath 2 of each fermentation vessel so that by means of pipes 7 and 8, which are connected to each other, the pressure in the interior of the wood cylinder and that in the intermediate space between it and the sheathing 2 are balanced. A pipe 9 for champagne passes from the reservoir 6 to filters 10 and 11, thence to the cooler 12 and thence to the filling and withdrawing apparatus. A pipe 13 leads from the withdrawing apparatus to the receiving vessel 14 for the purpose of emptying still wine from bottles which are to be filled with finished champagne. From the receiving vessel the still wine passes through the pipe 15 to the pump 16 and thence to one of the fermentation vessels through the pipe 17. Another pipe 18 leading from the pump 16 passes to the reservoir 6. From this reservoir leads a carbonic acid pipe 19 having branches connecting it to the cooler apparatus 12 and to the receiving vessel 14. Reducing valves 20 and 21 are located in the carbonic acid pipe 19 passing from the reservoir 6 and in the pipe 9 for the champagne passing from 6, for the purpose of reducing the pressure beyond 6 when filling bottles and also to regulate out the variations of pressure in 6 so as to cause these to be imperceptible in the filling apparatus. The pump 16 is also connected to each of the fermenting vessels 1 by means of a pipe 22 so that if desired the contents of any fermenting vessel may be transferred to the reservoir 6.

The cycle of operations for the manufacture of sparkling wine according to the present process is as follows: Yeast is first placed in the container 1 of the fermenting vessel A. This is then filled with still wine, to which is added the necessary quantity of sugar for the fermentation in forming sparkling champagne, and is hermetically sealed. When fermentation has commenced, and after about a quarter of the sugar has been fermented away, then the fermentation vessel B is in like manner filled with yeast and still wine. When the fermentation is also here well advanced, then both fermentation vessels A and B are connected together by opening the taps in the pipes 4, in such a manner that the wine passing upward from the last started vessel B can enter the first started vessel A from beneath. When one half of the sugar in A and one quarter of the sugar in B are decomposed, then the vessel C is set in action in the same manner and finally when three-quarters of the sugar in A, one half of the sugar in B, and one-quarter of the sugar in C are fermented, then the vessel D is set in action in like manner. The still wine introduced into the fermentation vessel D from below will now pass progressively through all the fermentation vessels from bottom to top. The carbonic acid formed in all the vessels by the fermentative process, remains in the wine, and in the system as it cannot escape. Immediately the fermenting vessel D is connected up in series all four vessels work together until the fermentation by the yeast gradually diminishes, which will first take place in the vessel A. This vessel is then disconnected from the others, emptied, and is then again filled with fresh yeast and still wine and again inserted into the system behind the fermenting vessel D. The degree of fermentation of the wine in the single vessels is different and increases from D to C and B to A when these vessels are working in this order stated and the fermentation of the wine is completed in passing to A. When a sample taken from A shows that the desired degree of fermentation is obtained, then A contains fermented wine laden with its own carbonic acid as required for the filling into bottles. A is now connected to the reservoir 6 and the receiving vessel 14 is connected to D through the pump 16. At the beginning of the filling operation, the bottles filled with still wine are successively hermetically connected to the filling apparatus, and by operating the latter the still wine is emptied from the bottles through 13 into the receiving vessel 14. Carbonic acid passes from the latter in amount corresponding to that of the wine entering. The valve in the pipe between the filling apparatus and the receiving vessel is then closed and the champagne pipe 15 opened. The displaced carbonic acid returns into the receiving vessel. The still wine passes out of the receiving vessel through 15 and its connections into the last fermenting vessel in series, say, D, and forces out of this a corresponding quantity of partly fermented wine into the fermenting vessel C; from this a similar quantity passes into B, and from this into A. As the wine is lighter where the fermentation is well advanced, than wine where the fermentation is not so far advanced, and as the pipes pass from below upward, therefore the wine which is most advanced in fermentation will always pass over to the next vessel.

When the yeast in the final fermenting vessel (A in this instance) becomes too old, it must be removed. It is essential for this purpose that the fermenting vessel A be completely emptied. To this end inlet pipes 4 leading from the fermenting vessel B are closed and the contents of the vessel A are transferred by means of the pump 16 through the pipe 18 gradually into the reservoir 6. The still wine which is being emptied from the bottles during this withdrawing operation is drawn off from the receiving vessel 14 by means of taps. The carbonic acid in the wine cannot meanwhile escape as the excess of carbonic acid formed in B, C and D occupies the free space and prevents a fall in pressure. The reducing valves 20 and 21 inserted in the carbonic acid pipe 19 and in the champagne pipe 9 beyond the withdrawing vessel 6 prevent any variation of pressure which may arise in the fermenting vessels during the filling period from being felt in the filling apparatus. When the fermenting vessel A is empty, it is opened, cleaned, charged with fresh yeast and still wine and inserted in the system behind D, whereupon the withdrawal of the finished champagne takes place from the fermenting vessel B, which has now been substituted for A, in a manner similar to that above described.

Owing to the regular renewal of the yeast on the one hand and owing to the various phases of the process taking place simultaneously in the different vessels, it is possible to keep the system in constant work, and at the same time the various differences in the operation of the yeast in the single vessels are averaged out in as thorough a manner as practicable. An addition of carbonic acid from outside sources is not necessary even when a fermenting vessel is completely emptied as stated above. In like manner, the detachment of a single fermenting vessel for the purpose of being freshly charged does not entail any interruption of the complete fermenting process.

If in the beginning more sugar be added to the still wine than is necessary for the purpose of champagne fermenting, then any desired amount may be caused to remain in the sparkling wine formed in and removed from the last vessel in series. Sparkling wine may therefore be obtained in every degree of sweetness direct from the fermenting system.

The present process presents advantages as compared with the old bottle fermentation, in that the fermentation takes place more evenly in large quantities than in the small quantities present in the champagne bottles, and further the operations in the large vessels may be controlled by all manner of technical accessories such as cooling and warming apparatus, manometers, thermometers, test cocks and the like, which is not possible in bottles; the processes in which cannot be controlled. The sparkling wine manufactured according to this process is characterized from these favorable conditions by a high degree of purity and palatableness. A further particular advantage which is to be considered is that according to the present process the operations are extremely uniform and fewer operators are required than in the ordinary bottle fermenting processes.

What I claim is:—

1. The process of conducting an uninterrupted manufacture of effervescent wine which comprises maintaining a plurality of fermenting vessels in series, each of said vessels being in a different stage of fermentation and all being under the pressure of the carbonic acid formed in fermentation, removing wine from bottles, and continuously transmitting the removed wine through the series from the youngest fermentation to the oldest and replacing it in the bottles after such passage.

2. In the operation of removing wine from bottles, further fermenting it in a series of fermenting vessels and returning it to bottles, the process of establishing differential fermentation in such fermenting vessels which comprises charging one such vessel with yeast and wine, after a time charging a second vessel in similar manner and after a time charging a third vessel in similar manner and then transmitting wine through such vessels in series from the third through the second to the first.

3. In the manufacture of sparkling wine the process which comprises passing still wine through a series of fermenting vessels in different stages of fermentation, each successive vessel containing wine in a more advanced state of fermentation than that in the preceding vessel, and withdrawing it as sparkling wine from the last vessel in series, said wine in said vessels being under uniform pressure from the carbonic acid evolved in the system.

In testimony whereof I affix my signature in presence of two witnesses.

ADOLF RÖMER.

Witnesses:
ERNEST ENTENMANN,
ADOLF LEBHERZ.